United States Patent [19]
Oberholzer et al.

[11] Patent Number: 5,950,905
[45] Date of Patent: Sep. 14, 1999

[54] METHOD AND APPARATUS FOR WELDING CONTAINER BODIES

[75] Inventors: Marcel Oberholzer, Kindhausen; Hermann Schuppisser, Maegenwil; Urs Gehrig, Otelfingen; Markus Weber, Spreitenbach, all of Switzerland

[73] Assignee: Elpatronic AG, Bergdietikon, Switzerland

[21] Appl. No.: 08/838,269

[22] Filed: Apr. 17, 1997

[30] Foreign Application Priority Data

Apr. 25, 1996 [CH] Switzerland ............................ 1046/96

[51] Int. Cl.⁶ .................................................. B23K 31/02
[52] U.S. Cl. .......................... 228/144; 228/151; 198/789
[58] Field of Search ................................... 228/102, 144, 228/17.5, 4.1, 150, 151; 29/33 D, 33 T; 219/61, 61.5, 64; 198/788, 789

[56] References Cited

U.S. PATENT DOCUMENTS

| | | |
|---|---|---|
| 759,557 | 5/1904 | Scholtz ..................................... 198/789 |
| 3,584,178 | 6/1971 | Huber et al. ............................ 219/61.5 |
| 4,497,995 | 2/1985 | Nilsen .................................. 219/121.63 |
| 4,769,522 | 9/1988 | Lentz et al. ......................... 219/121.63 |
| 4,865,243 | 9/1989 | Meier ..................................... 228/17.5 |
| 5,497,935 | 3/1996 | Gravier ................................... 228/17.5 |
| 5,679,272 | 10/1997 | Aderhold ............................... 219/61.5 |

*Primary Examiner*—Samuel M. Heinrich
*Attorney, Agent, or Firm*—McCormick, Paulding & Huber LLP

[57] ABSTRACT

In a guide and calibrating tool for guiding container bodies for welding, at least one of the guide rollers is driven. The drive is pneumatic, by compressed air blown by a nozzle onto recesses in the roller. The roller is driven only initially upon restart of the welding machine or in the event of a break in the passage of a series of bodies, in order that no braking is caused by the arrival at the guide tool of the first (and possibly second) body. This enables the gaps between the bodies to be kept more constant even at the start of a series of bodies to be welded, and the first bodies to be welded do not suffer increased slip between the bodies and the welding electrodes.

17 Claims, 2 Drawing Sheets

METHOD AND APPARATUS FOR WELDING CONTAINER BODIES

BACKGROUND OF THE INVENTION

The invention relates to a method of welding hollow cylindrical bodies, in particular container bodies, in which the bodies pass through a guide tool comprising a plurality of rollers before reaching a welding station. The invention also relates to an apparatus for performing the method.

In a known process, hollow cylindrical bodies, eg. container bodies and in particular can bodies, are formed from flat sheet-metal blanks, either by butting the edges together or by forming an overlapping region which is then joined by roller seam welding. In the roller seam welding process, the bodies to be welded are, as is known, guided through a large number of rollers ahead of the welding zone, the rollers conforming to the body to be welded, which define a passage surrounding the body or a guide tool, eg. according to CH-A 671904. Such roller guide tools maintain the shape of the body and force the longitudinal edges of the body into engagement with a Z-rail which establishes the butting or overlapping of the longitudinal edges required for welding. Roller seam welding is then performed by feeding the blank through the guide tool, and with welding rollers acting on the overlap, usually with the use of wire electrodes. For the welding of container bodies, a series of such bodies are guided in succession through the guide tool to the welding rollers.

On initial start-up of the welding machine and on every start following a machine stop, the problem then arises that, at high rates of travel (over approximately 90 meters per minute), the first bodies run into each other, ie. the gap between the first and second (and possibly third) bodies cannot be set to the optimum. For these bodies, moreover, the slippage which occurs between the welding rollers and the bodies is relatively severe. This is revealed by the fact that the tin mark left by can bodies on the spent electrode wire is longer than the body length: for example, with a body length of 125 mm at a rate of travel of 138.8 m/min it is 139 mm for the first body, 133 mm for the second body, and a constant 128 mm for the subsequent bodies. Such slippage of the initial bodies is undesirable and is detrimental to weld quality.

Therefore the object which lies at the basis of the invention is to provide a welding method in which these drawbacks do not occur, or occur only to a limited degree.

SUMMARY OF THE INVENTION

In a method of the kind indicated at the outset this is achieved by driving at least one of the rollers.

By driving at least one roller, it is possible to compensate for the braking effect of the guide tool which is otherwise stationary on start-up of the body feed and of the welding operation, so that the first and second bodies travel to the welding rollers at substantially the required speed.

Preferably the drive is switched on only before and during the transit of the first, and if necessary the second, body of a series of bodies, since the rollers can subsequently be kept rotating at the required rate by the bodies passing through. Preferably, a plurality of rollers are driven.

In a preferred embodiment, the driven roller, or each driven roller, is driven by a jet of compressed air. For this purpose, recesses are preferably provided in the roller, into which the jet of compressed air is blow so as to propel the roller.

A further object at the basis of the invention is to provide an apparatus for performing the method.

BRIEF DESCRIPTION OF THE DRAWINGS

Embodiments of the invention will now be described in detail by way of example and with reference to the drawings, in which.

DESCRIPTION OF THE PREFERRED EMBODIMENTS

Figure 1:
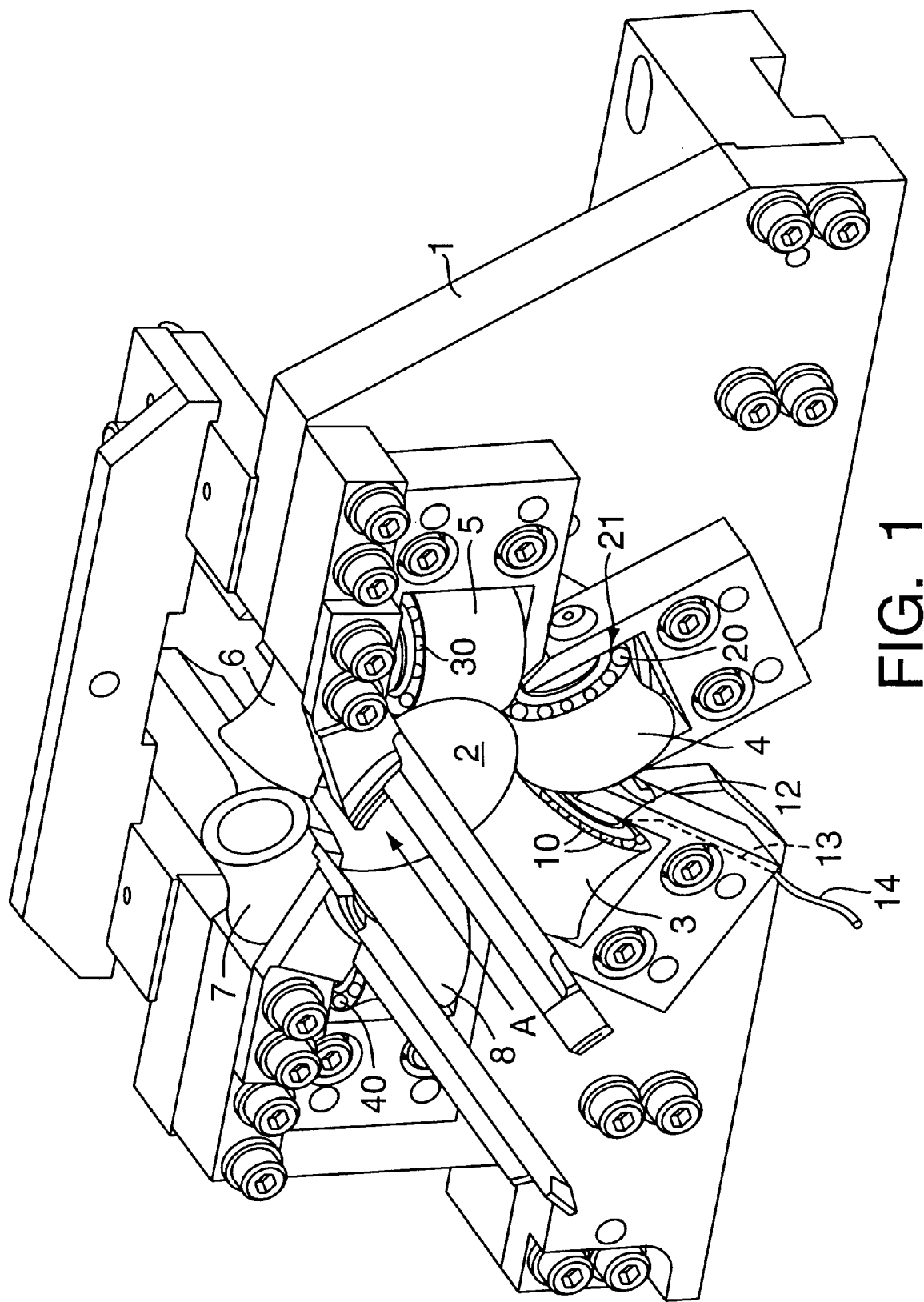
FIG. 1 is a perspective view of a guide tool for carrying out the invention.

FIG. 1 is a perspective view of a guide tool or calibrating tool 1, the basic principle of which is known. The tool has a series of rotatably mounted rollers 3,4,5,6,7 and 8, whose circumferential shape is matched to the bodies to be welded, and which form an essentially circular passageway 2 through which the containers or other bodies to be welded are conveyed in the direction of the arrow A and are guided and calibrated by the rollers. The welding rollers with their wire electrodes are arranged in a known fashion downstream of the rollers 3–8 in the conveying direction, and weld together the overlapped or butted longitudinal edges of the container bodies which have passed through the opening 2.

At the start of the welding of a series of bodies, or after any interruption of welding, the rollers 3–8 are stationary. This has the effect of braking the first bodies passing through the passageway 2 upon start-up of the machine, which on the one hand may reduce unacceptably the distance between these first bodies and those which follow, and on the other hand causes increased slippage of the first bodies in relation to the welding rollers and/or wire electrodes, which are being driven at the required speed. By the time the first (and possibly the second) body has passed through the guide tool 1, the friction from the body or bodies has brought the rollers up to the required speed, so that the correct spacing is reestablished between the bodies which follow and excessive slippage does not occur. In accordance with the present invention, one or more of the rollers are driven in order to create similar conditions for the initial bodies.

In the illustrated preferred example, the four rollers 3,4,5 and 8 are driven, but the somewhat smaller rollers 6 and 7 are not. One could, of course, drive just one of the rollers 3–8, or some other number of rollers within the total set. It would also be possible for all the rollers to be driven.

Preferably, the rollers are driven by a compressed air jet which is active only at selected periods. The drive may then be operative only before and during transit of the first (and possibly the second) body through the opening 2 or eg. during a period of time which is freely adjustable. Thereafter the drive is switched off, and the rollers are driven by the bodies running through, the guide tool, as before. Upon restarting after every break in operation of the welding machine resulting in a stoppage of the rollers, the drive to the rollers is reactivated for a period of time, that is before and during the transit of the first (and if necessary the second) body, eg. during a total time of 5 seconds, or during some other freely adjustable period.

The drive input is preferably pneumatic. For this purpose the driven rollers—rollers 3,4,5 and 8 in the example shown—are provided with a large number of recesses onto which a jet of compressed air is directed at an oblique angle so as to set the rollers rotating. Instead of the recesses, it is of course possible to provide the rollers with projections which cause the rollers to rotate when compressed air is blown on them. In the example shown, the recesses are located around the rim of an end face of the roller concerned, as is shown in the case of the roller 3 by the recesses 10, in the roller 4 by the recesses 20 and in the roller 5 by the recesses 30 and in the roller 8 by the recesses 40. The recesses are in this case blind holes drilled laterally into the rollers. Other forms of recess are of course possible, eg. those which will ensure optimal entry and discharge of the air flow, and also a different arrangement of the recesses at the rim of the rollers.

In the example shown, nozzles 12,21,22 and 23 (FIG. 2) for directing compressed air on to the blind holes are arranged on the respective roller brackets and are each supplied with compressed air through a duct located in its bracket. In FIG. 1 the duct is indicated only for the nozzle 12 on the bracket for the roller 3, and is designated 13. The other roller brackets have similar ducts, but they are not shown in the figure. Connected to the duct 13 is a compressed air line 14 which feeds compressed air to the duct and nozzle, and similar air lines are of course connected to the other ducts.

Figure 2:
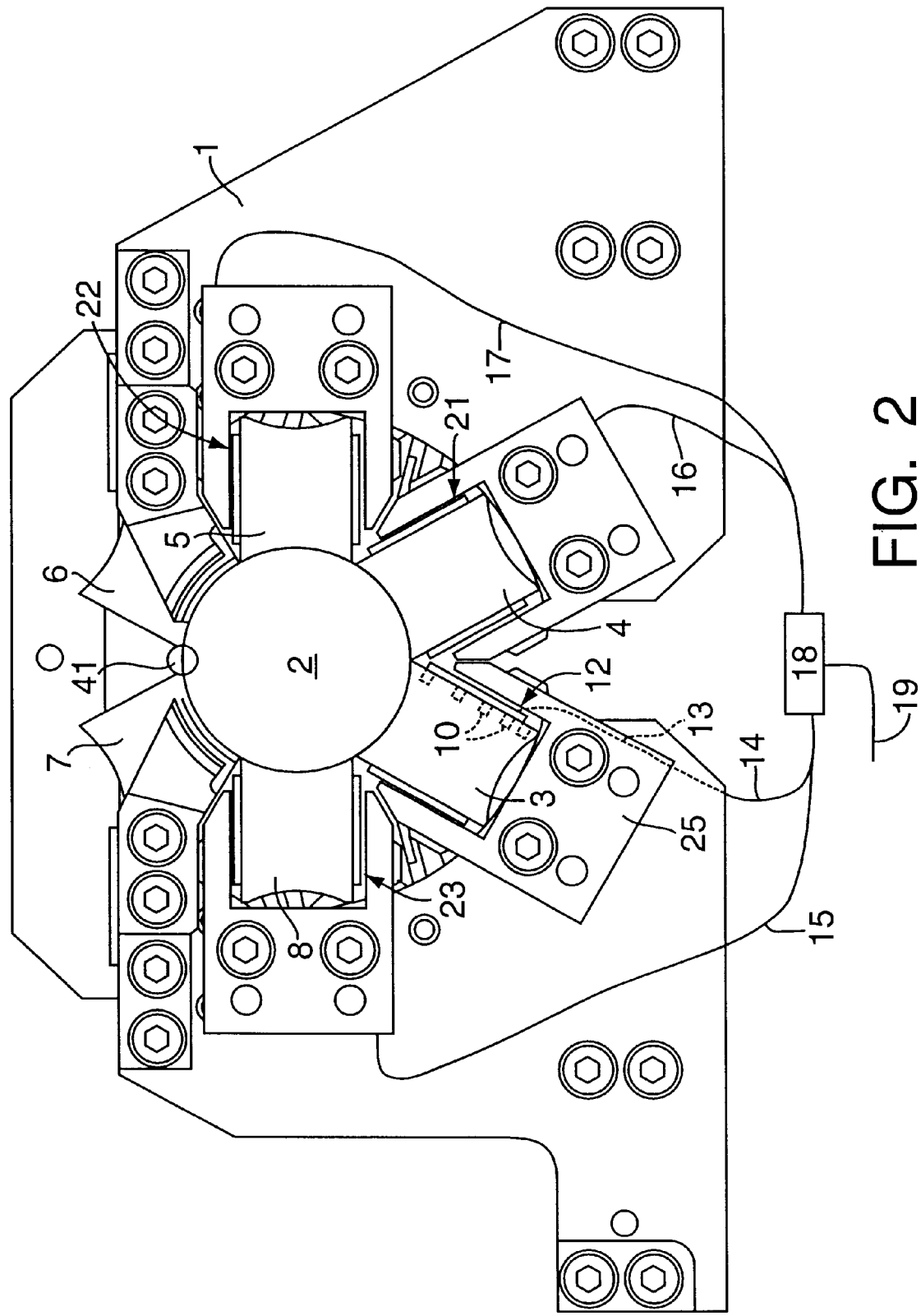
FIG. 2 is a front view of the guide tool of FIG. 1.

FIG. 2 is a front view of the same calibrating and guide tool 1 as shown in FIG. 1, the same parts being designated by the same reference numbers. The passageway 2 for the bodies can again be seen, and the symbol 41 indicates the location of the welding station or welding plane behind the tool 1. In FIG. 2 the recesses in the rollers are indicated only in the roller 3; the nozzles 22 and 23, which are not illustrated in FIG. 1, can now be seen. In FIG. 2, again only the duct 13 in the bracket 25 for the roller 3 is illustrated, and the remaining ducts in the brackets for the rollers 4,5 and 8 are not shown. Represented schematically in FIG. 2 are the compressed air lines 14,15,16 and 17 leading to the respective ducts and nozzles 12,21,22 and 23. These compressed air lines are supplied by a pressure reducing valve 18, connected in turn via a line 19 to a conventional machine source of compressed air which is not illustrated.

In the embodiment shown in FIGS. 1 and 2, the recesses are, as stated, in the form of blind holes, with a diameter of eg. 2.5 mm. Air is blown on to these blind holes by nozzles with an outlet diameter of eg. 1 mm. The clearance between each nozzle outlet and the roller is eg. approximately 0.2 mm, and the angle of the nozzle to the roller may be eg. 30° or such other angle as will give optimal impingement on the roller. The compressed air is discharged at a pressure of eg. approximately 2 bar, the pressure preferably being regulatable so that the speed and acceleration of the rollers can be adjusted. Preferably at least the driven rollers are made of lightweight material so that their inertia is low. The driven rollers may be made from ceramic material as well as from steel or other material.

Driving the rollers in accordance with the invention results in a more constant spacing of the bodies, specifically the first and second bodies, of a series of bodies to be welded. This in turn makes it possible to maintain smaller gaps between the bodies of a series of bodies than when using a conventional, non-driven guide tool. For example, with a non-driven guide tool, for a body length of 125 mm and a rate of travel of 138.8 meters per minute, it is necessary to set a spacing of approximately 2 mm between bodies in order to prevent collision between the initial bodies. With the same parameters, by the use of the driven guide tool according to the invention the body spacing can be reduced to 0.8 mm, and held at this value even for the first and second bodies. The drive may also be switched on occasionally in the course of a run, should a break in the run occur as the result of a malfunction, in order to prevent the rollers slowing down and to carry the first body (and if necessary the second body) after the break unhindered through the rollers to the welding zone.

By means of the invention, welds of good quality can be obtained even with the rate of travel increased far beyond 90 meters per minute.

We claim:

1. A method of welding hollow cylindrical bodies, comprising the steps of:
   providing a guide tool including a plurality of rollers for passing the bodies therethrough before reaching a welding station; and
   impinging compressed air on at least one of the plurality of rollers for driving the at least one roller before and during transit of the first body, or during transit of the first and second bodies of a series of bodies to be welded, and thereupon terminating the step of impinging.

2. A method as defined in claim 1, wherein the step of providing includes providing recesses on the at least one roller for being impinged upon by the compressed air.

3. A method as defined in claim 1, wherein the step of providing includes providing recesses at a rim of an end face of the at least one roller.

4. A method as defined in claim 1, wherein the step of impinging compressed air includes supplying an adjustable compressed air flow.

5. A method of welding hollow cylindrical bodies, comprising the steps of:
   providing a guide tool including a plurality of rollers for passing the bodies therethrough before reaching a welding station; and
   impinging compressed air on at least one of the plurality of rollers for driving the at least one roller before and during transit of the first and second bodies of a series of bodies to be welded, and thereupon terminating the step of impinging.

6. A method as defined in claim 5, wherein the step of providing includes providing recesses on the at least one roller for being impinged upon by the compressed air.

7. A method as defined in claim 5, wherein the step of providing includes providing recesses at a rim of an end face of the at least one roller.

8. A method as defined in claim 5, wherein the step of impinging compressed air includes supplying an adjustable compressed air flow.

9. A method of welding hollow cylindrical bodies, comprising the steps of:
   providing a guide tool including a plurality of rollers for passing the bodies therethrough before reaching a welding station, at least one of the rollers defining recesses; and
   impinging compressed air on the recesses of the at least one of the plurality of rollers for predetermined periods to drive the at least one roller.

10. A method as defined in claim 9, wherein the step of impinging includes impinging compressed air before and during transit of the first body, or of the first and second bodies of a series of bodies to be welded, and thereupon terminating impingement of the compressed air.

11. A method as defined in claim 9, wherein the step of impinging includes impinging compressed air before and during transit of the first and second bodies of a series of bodies to be welded, and thereupon terminating impingement of the compressed air.

12. A method as defined in claim 9, wherein the step of providing includes providing recesses at a rim of an end face of the at least one roller.

13. A method as defined in claim 9, wherein the step of impinging compressed air includes supplying an adjustable compressed air flow.

14. A method of welding hollow cylindrical bodies, comprising the steps of:

providing a guide tool including a plurality of rollers for passing the bodies therethrough before reaching a welding station; and driving at least one roller by a power source other than the momentum of the bodies conveyed over the rollers during a period of time before and during transit of the first body, or during transit of the first and second bodies of a series of bodies to be welded, and thereupon terminating the step of driving.

15. A method of welding hollow cylindrical bodies as defined in claim 14, wherein the step of driving includes impinging compressed air on at least one of the plurality of rollers.

16. A method as defined in claim 15, wherein the step of providing includes providing recesses on the at least one roller for being impinged upon by the compressed air.

17. A method as defined in claim 15, wherein the step of impinging compressed air includes supplying an adjustable compressed air flow.

* * * * *